United States Patent [19]

Ritter

[11] Patent Number: 4,496,412
[45] Date of Patent: Jan. 29, 1985

[54] MULTIPLE LAP-JOINT FOR THERMOPLASTIC LAMINATES AND METHOD OF MAKING THE LAP-JOINT

[75] Inventor: James D. Ritter, Wichita, Kans.

[73] Assignee: The Boeing Company, Seattle, Wash.

[21] Appl. No.: 567,773

[22] Filed: Jan. 3, 1984

[51] Int. Cl.³ .............................. B31F 5/00; B32B 3/00
[52] U.S. Cl. ................................. 156/157; 156/304.5; 156/289; 428/60
[58] Field of Search .......................... 428/60, 57, 58; 156/157, 182, 304.5, 304.6, 289

[56] References Cited

U.S. PATENT DOCUMENTS

| | | | |
|---|---|---|---|
| 2,827,412 | 3/1958 | McKay | 428/60 |
| 3,300,826 | 1/1967 | Read | 156/157 |
| 3,619,314 | 11/1971 | Ecureux | 156/182 |
| 3,985,169 | 2/1976 | Chow | 156/304.5 |
| 4,279,676 | 7/1981 | Morrison et al. | 156/159 |

Primary Examiner—John E. Kittle
Assistant Examiner—James J. Seidleck
Attorney, Agent, or Firm—Edwin H. Crabtree

[57] ABSTRACT

A multiple lap-joint for sheets of thermoplastic laminates, the laminates having edges separated by high temperature removable film separators. The laminate sheets are heated under pressure and formed. The separators are then removed and the feathered edges of two adjoining sheets are interleaved and the sheets are reheated under pressure forming an integrally formed lap-joint.

1 Claim, 5 Drawing Figures

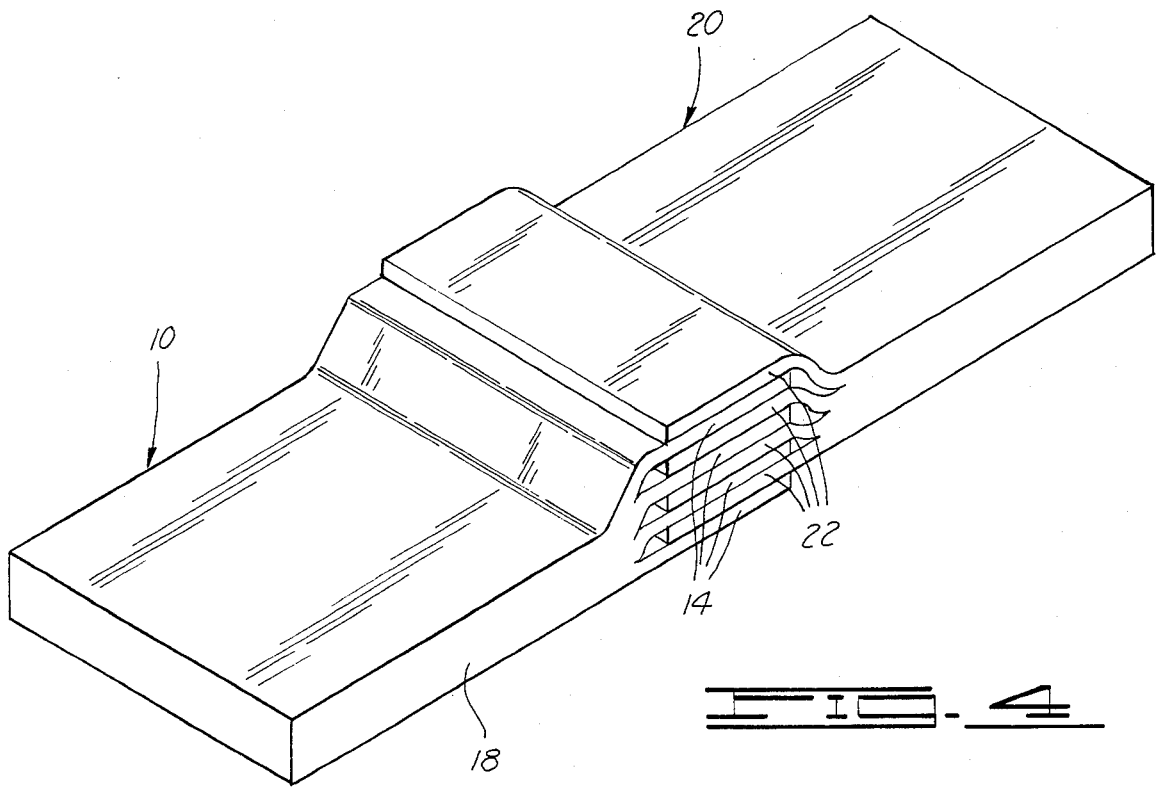
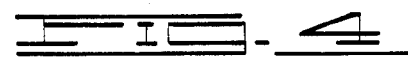
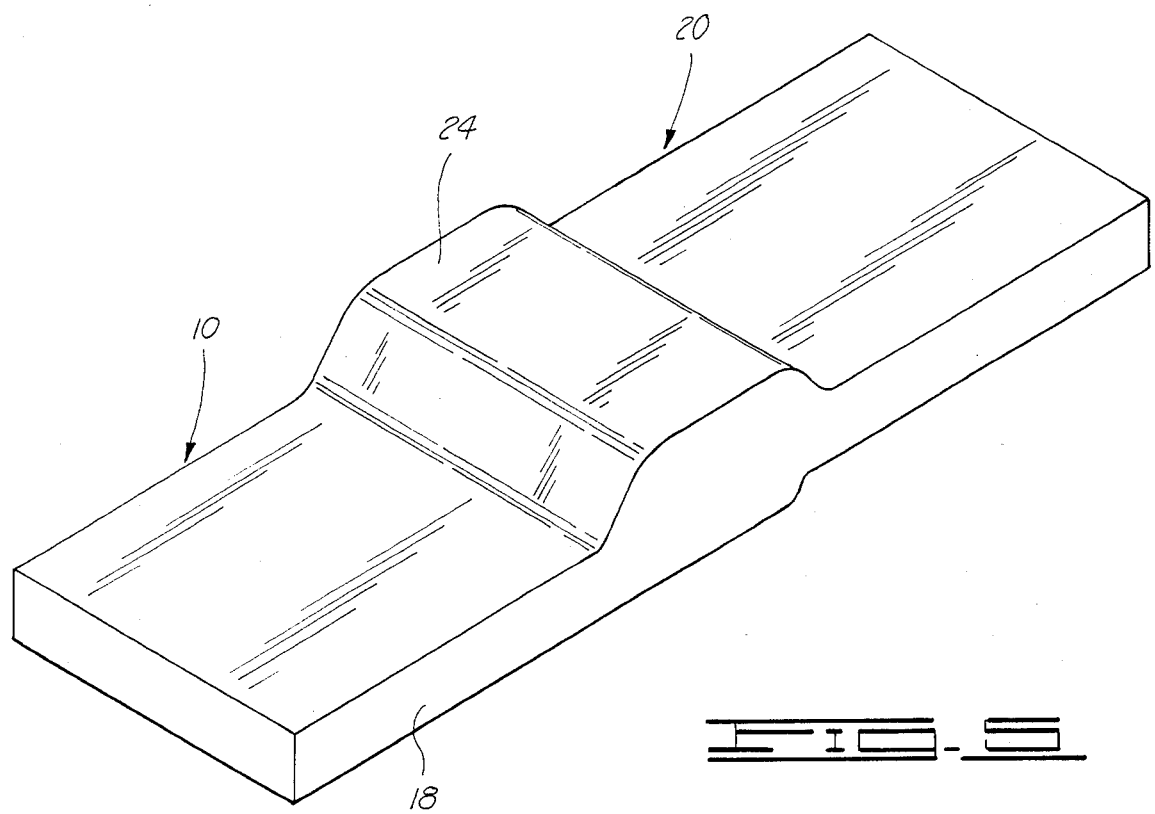
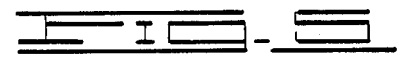

MULTIPLE LAP-JOINT FOR THERMOPLASTIC LAMINATES AND METHOD OF MAKING THE LAP-JOINT

BACKGROUND OF THE INVENTION

This invention relates to a lap-joint between two plastic sheets and more particularly but not by way of limitation to a pair of thermoplastic laminate ply sheets joined together by a multiple lap-joint.

Heretofore, attempts have been made at obtaining stronger bonded joints, by joining together thermoplastic laminate sheets using improved adhesive, the design of which was found to be expensive and time-consuming. Further, different joint geometries such as double-lap joints, scarf joints and reinforced butt joints were used to increase joint strength, but required either more material in the joint area or machining of the joint area. More material resulted in higher joint weight and machining was found to be undesirable and expensive.

In U.S. Pat. No. 3,046,181 to Mann et al, U.S. Pat. No. 3,300,826 to Read, U.S. Pat. No. 3,388,020 to Gates, U.S. Pat. No. 3,619,314 to Ecureus, U.S. Pat. No. 3,985,169 to Chow, U.S. Pat. No. 4,279,676 to Morrison et al and U.S. Pat. No. 4,366,014 to Pollard various types of laminates are shown using different means of joining together adjacent sheets of thermoplastic. Also, some of the above mentioned patents disclose different types of joining together wood products. None of these prior art patents specifically disclose the unique features of a multiple lap-joint and method of making the lap-joint as described herein.

SUMMARY OF THE INVENTION

The subject multiple lap-joint for thermoplastic ply laminate sheets solves the problem of insufficient bond strength when using conventionally bonded single lap-joints.

The multiple lap-joint avoids the problem of cutting fibers thus reducing joint strength when drilling holes in laminates for inserting conventional fasteners.

The multiple lap-joint does not require adhesives, does not add extra weight and does not include fasteners. Overall strength is improved since the multiple lap-joint is integrally formed between the adjacent edges of the two thermoplastic sheets.

The multiple lap-joint for thermoplastic ply laminate sheets includes the use of inserting high temperature film separators between the edges of the plies of the two adjacent laminate sheets. The laminate sheets are subjected to heat and pressure and bonded together. The film separators are removed forming feathered edges along the sides of the sheets. The feathered edges are then interleaved and then subjected to localized heat and pressure and bonded together forming an integrally formed multiple lap-joint.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 4 illustrates the two feathered edges of the sheets interleaved together.

FIG. 5 illustrates the interleaved edges bonded together.

DETAILED DESCRIPTION OF THE DRAWINGS

Figure 1:
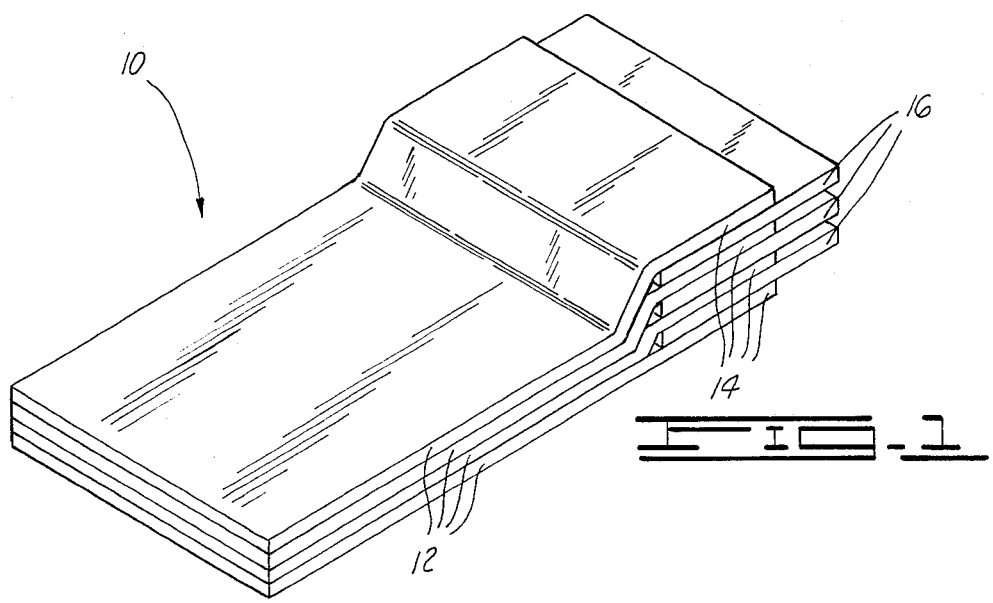
FIG. 1 illustrates one of the thermoplastic laminate ply sheets having a plurality of film separators between the edges of the plies.

In FIG. 1 a perspective view of a thermoplastic laminate ply sheet is designated by general reference numeral 10. The sheet 10 includes a plurality of plies 12 with edges 14 being separated from each other by a plurality of high temperature film separators 16. The film separators may be of Kapton, aluminum or any other high temperature non-bonding film separator treated with a release agent. Also, the film separator should be approximately the same thickness as the individual plies 12. The sheet 10 shown in FIG. 12 has been heated under pressure and cured, forming a single sheet 18. An identical second sheet 20 is treated in the same fashion as the initial thermoplastic sheet 10.

Figure 2:
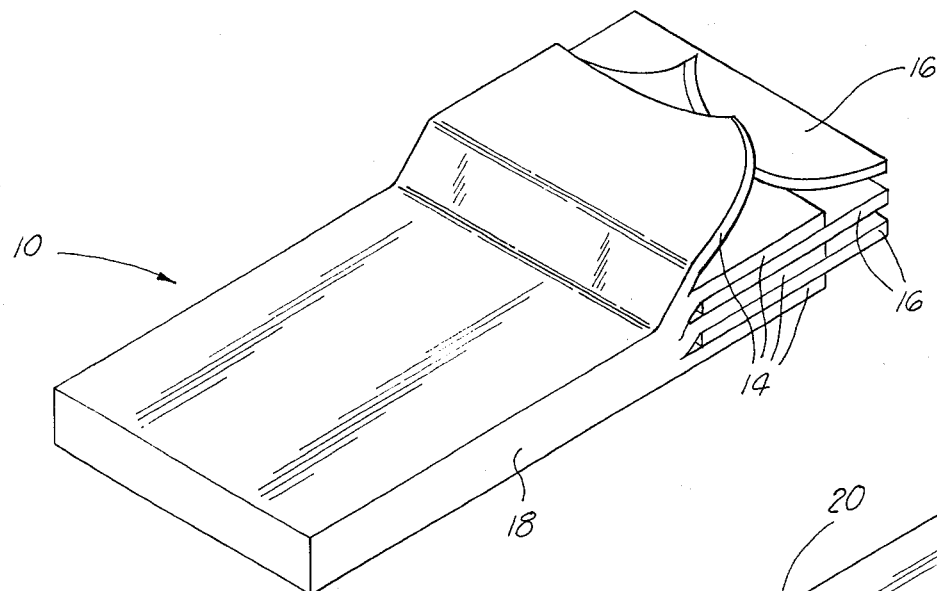
FIG. 2 illustrates removing the film separators after the sheet has been heated under pressure and bonded together.
Figure 3:
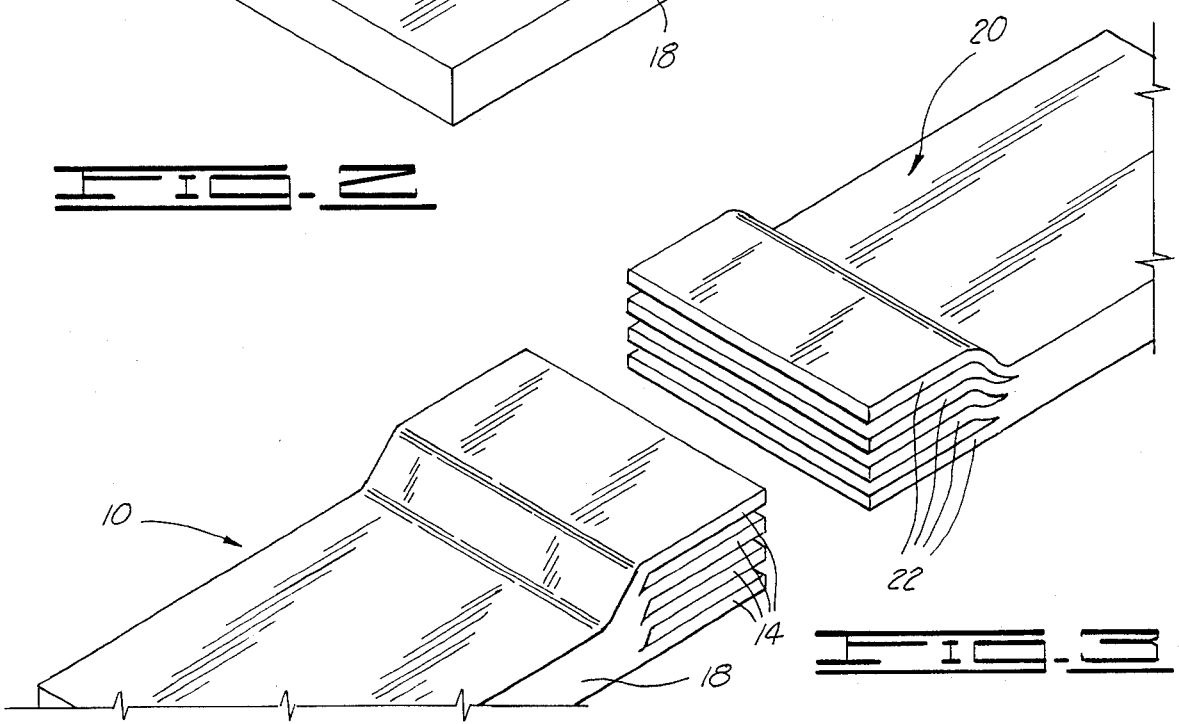
FIG. 3 illustrates two bonded thermoplastic ply laminate sheets disposed adjacent to each other with feathered edges.

In FIG. 2 upon the heating and curing of the sheet 10, the film separators 16 are removed, forming a plurality of feathered edges 14 of the sheet 10 and feathered edges 22 of the adjacent sheet 20 as shown in FIG. 3.

In FIG. 4 the two sheets 10 and 12 are positioned adjacent each other and the individual feathered edges 14 and 22 are interleaved together as shown. When this has been completed, the two sheet 10 and 20 are again reheated under pressure and cured, forming an integral multiple lap-joint 24 as shown in FIG. 5.

Because thermoplastic material has the unique ability to be heated and reformed, no additional material or adhesive is required to form the multiple lap-joint 24. This joint 24 will be stronger than any conventional joint because of the multiple lap-joint formed by the interleaving of the feathered edges 14 and 22.

The multiple lap-joint and method of forming the lap-joint provides a solution to the problem of insufficient bond strength using conventionally bonded single lap-joints between thermoplastic laminate sheets.

Changes may be made in the construction and arrangement of the parts or elements of the embodiments as described herein without departing from the spirit or scope of the invention defined in the following claims.

What is claimed is:

1. A method of forming a multiple lap-joint between two sheets of thermoplastic ply laminates, the steps including:
    inserting high temperature film separators between the edges of the plies of the two laminate sheets;
    heating and bonding together the plies of the two laminate sheets;
    removing the film separators from the edges of the two sheets thereby forming feathered edges;
    interleaving together the feathered edges of the sheets; and
    reheating and bonding together the feathered edges of the sheets and forming a lap-joint therebetween.

* * * * *